Figure 1:
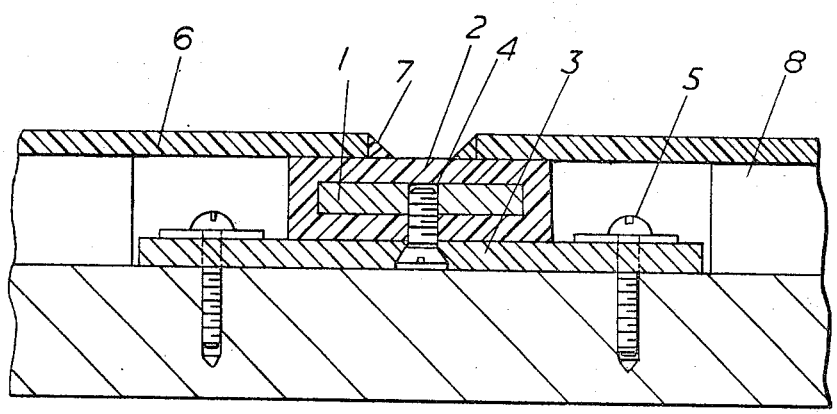

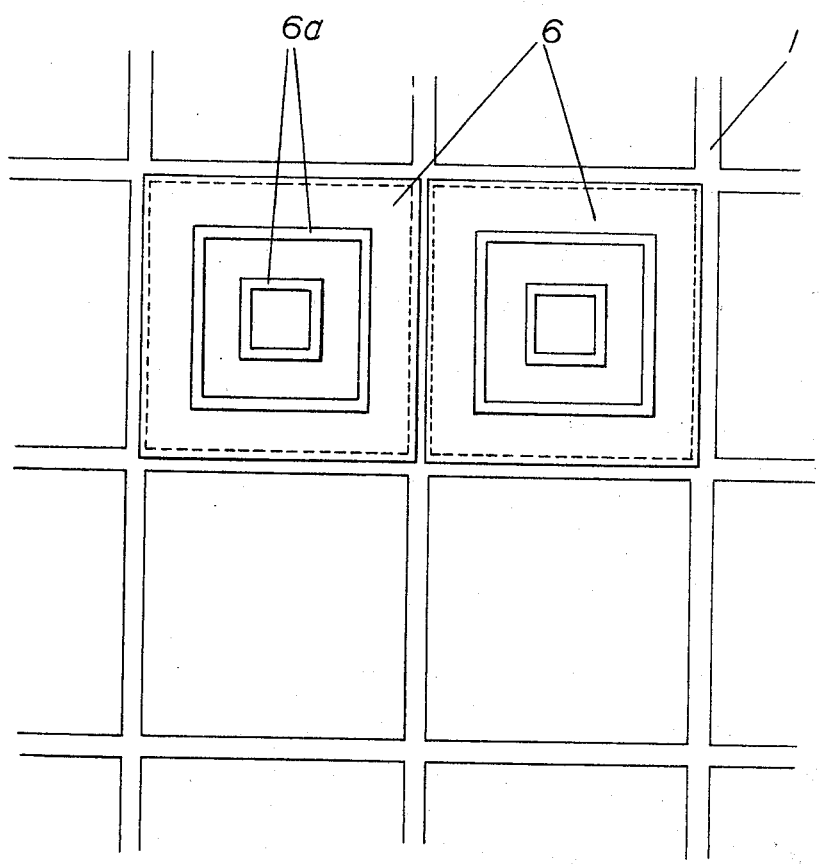

3,325,045
METHOD OF INTERNALLY LINING RECEPTACLES AND RECEPTACLES SO LINED
Fortuné Habozit and Andre Neyroud, Lyon, France, assignors to C.I.P.S.O. Compagnie Industrielle de Plastiques Semi-Ouvres, Paris, France, a French body corporate
Filed Feb. 12, 1965, Ser. No. 432,354
Claims priority, application France, Feb. 14, 1964, 963,852
18 Claims. (Cl. 220—63)

The present invention concerns a method of providing an anti-corrosive lining consisting of plastic materials in vats, tanks and other receptacles of large capacity consisting of wood, metal, cement, etc.

It is known to use sheets of plastic materials to line receptacles internally. For example, the sheets may be adhesively secured to the walls to be lined by means of adhesives, the sheets being connected together edge-to-edge. This method has a number of disadvantages, for example it necessitates a preparation of the walls to be lined, and the adhesives employed have low resistance to thermal stresses and undergo degradation due to ageing. Moreover the differences in expansion and contraction produce deformations of the lining and breakages of the weld, resulting in loss of fluid-tightness. Furthermore, the adhesive securing method is not applicable to all plastic materials. One of the best materials for anti-corrosive lining is polyethylene, but in practice no adhesive is known by which it can be durably secured.

It is further possible to provide a lining independent of the support by welding together sheets which adapt themselves to the profile of the receptacle, the sheets being secured only to the upper edge of the receptacle. In this case, it has been found that the vertical sheets become deformed by creep under the action of their own weight when the receptacle is of considerable dimensions.

According to the present invention there is provided a method of internally lining receptacles such method comprising securing to the walls to be lined a wide meshed supporting grid of rigid material encased in a weldable plastics material and then securing to the casing by welding, lining plates of a plastics material, sufficient to cover the walls to be lined.

The grid is preferably constructed with metal elements, for example flat iron sections of a few centimetres in width and a few millimetres in thickness. These sections may be welded together so as to form a network whose meshes, which are preferably square, advantageously measure about 1 m. along each side. For the convenience of the assembly, elements comprising 2, 4 or more meshes may first be prepared in the workshop and thereafter assembled by welding in situ within the receptacle.

The encasing of plastics material may be effected before or after preparation of the covering. For example, it is possible to thread onto the sections, flattened tubes of plastics material which adapt themselves to the shape of the section. For the welding of the sections, the ends are temporarily bared, whereafter the weld positions are optionally re-coated with molten plastics material to ensure an integral encasing.

The grid may alternatively be encased after the welding of the elements. This encasing may be effected, for example, with split tubes, the lips of which are thereafter closed by welding, with sections formed of two parts which adapt themselves to the shape of the elements, for example a channel section and a flat strip covering the elements and secured together by welding. These casings may be provided in the workshop. Finally, the encasing may be effected in situ in the receptacle to be lined, by disposing between the wall of the receptacle and the elements of the grid, before or after welding, strips of plastics material of slightly greater width than the elements of the grid, and then covering the elements with sections of plastics material, for example of U-shape, so as to coat them along the sides which are not in contact with the strips, and finally connecting these sections to the strips by welding. In this case, the elements of the flat iron sections are preferably of greater width than in the other embodiments referred to.

The coating of plastics material must have sufficient thickness to enable the plate of plastics material to be secured by welding.

The attachment of the grid to the walls of the receptacle may be carried out in various ways. One method consists in securing fixing plates, for example by means of screws, to the grid elements, which are encased before or after assembly, at regular intervals, for example at intervals of 0.5 m., and then fixing these plates on the wall by any known means, such as screws, nails, rivets or welding.

When the above-described two-stage encasing method is chosen, the grid may be secured to the wall by means of screws, rivets, etc., which extend both through the grid and through the plastic strip disposed between the wall and the grid, and the elements may be encased only then in U-shaped plastics sections, which are welded to the strips.

The plates of plastics material are thereafter positioned, the plates having a size slightly larger than the internal dimensions of the meshes of the covering, so as to cover at least a few millimetres of the lined sections. On the other hand, there must be sufficient space between the plates disposed on the lining to permit fillet welding by weld deposit on the casing.

The plates are preferably formed with one or more corrugations, which are advantageously concentric (circular or rectangular) and act in bellows fashion to permit taking up expansion and contraction. These corrugations may have, for example, a width of 40 mm. and a height of 10 mm. In the case of plates having sides of 1 metre, they permit of cancelling out the effect of an elongation or a contraction up to 25 mm. These corrugations are obtained by conventional means, such as hot embossing, or vacuum forming.

The plates are disposed on the grid preferably in the neighbourhood of the lowest temperature which the vat is to withstand, in order that the whole lining may thereafter work in expansion rather than in contraction.

The free space between the wall and the plastics lining may be filled with a complete or partial packing of wood, cork or sand.

This packing reinforces the lining by enabling it to resist local pressures, caused, for example, by workmen in the vat, or distributed pressures caused by pressure of the liquid contents. If desired, it may contribute to the heat insulation of the vat.

The lining may be formed from any suitable weldable plastics material e.g. polyolefines such as polyethylene polypropylene; vinyl derivatives such as polyvinyl chloride; polystyrene and its copolymers such as acrylonitrile-butadiene-styrene copolymers; polyesters, polycarbonates; or polyamides.

The method makes it possible to use more particularly polyolefines which have particularly favourable resistance to corrosive agents and which it has hitherto been difficult to secure to walls by reason of the fact that adhesive securing has been impossible.

The plates preferably have a thickness of a few millimetres, for example 3 mm.

Figure 2:
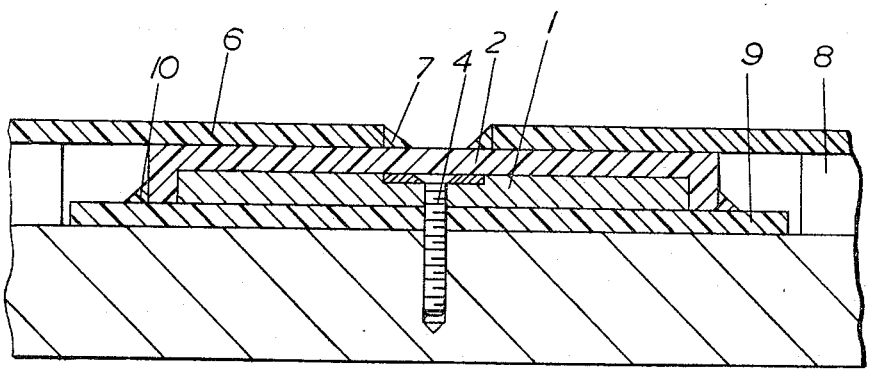

In order that the invention may be more fully understood, the following description is given, by way of example, with reference to the accompanying drawings in which:

FIGURES 1 and 2 illustrate in section particular embodiments of lining according to the invention; and FIGURE 3 is a plan view of the lining of FIGURE 1 or FIGURE 2.

FIGURE 1 illustrates a method of lining with the aid of tubes of plastics material. A grid of flat iron sections 1 has each of its sections encased in a sheath 2 of plastics material. The encased flat iron section is fixed to a securing plate 3 by means of a screw 4, the securing plate being in turn secured to the wall of the receptacle by means of screws 5. Lining plates 6 of plastics material are welded to the sheath 2 by a fillet weld 7. A filling 8 is arranged between the plate of plastics material and the wall of the tank.

FIGURE 2 illustrates the method of lining by means of strips and plastics sections. A flat iron section 1, is disposed on a strip 9 of plastics material and is secured to the wall of the receptacle by means of a screw 4. Disposed on the said flat iron section is a channel section 2 of plastics material which is fillet-welded at 10 to the plastics strip. Two lining plates 6 are welded to the channel section by a fillet weld 7. A filling 8 of wood is arranged between the plate 6 and the wall of the tank.

FIGURE 3 illustrates positioning of the lining plates 6 on the grid of iron sections 1, corrugations being illustrated at 6a these serving to take up expansion and contraction of the plates 6.

The method according to the invention makes it possible to produce fluid-tight anti-corrosive linings of large dimensions which it has hitherto been impossible to produce. It requires no preparation of the walls (smoothness, adhesions, etc.) and can be used in the overhauling of old tanks. The repairs can readily be carried out. The problem of contraction and expansion is solved, so that it is possible to use the receptacles under extreme temperature conditions. On the other hand, a large part of the lining may be prefabricated in the workshop and therefore under the best working conditions.

We claim:

1. A method of internally lining the walls of receptacles, such method comprising the steps of: forming members of a rigid material into a wide meshed supporting grid; encasing the members of the grid in a weldable plastics material; securing the thus encased grid to the walls to be lined; and welding to the casing of the grid, lining plates of a weldable plastics material, sufficient to cover the walls to be lined.

2. A method of internally lining receptacles as specified in claim 1 wherein the rigid members forming the grid are constructed of flat elements of iron.

3. A method of internally lining receptacles as specified in claim 1 wherein the members forming the grid are encased by threading tubes of plastics material onto the members.

4. A method of internally lining receptacles as specified in claim 1 wherein the members forming the grid are encased by covering them with a channel section of plastics material and a strip of plastics material and subsequently securing these together.

5. A method of internally lining receptacles according to claim 1 wherein the grid elements are secured to fixing plates, and the fixing plates are subsequently affixed to the receptacle walls.

6. A method of internally lining receptacles according to claim 1 wherein the grid is secured to the wall by screw means, said screw means extending through the grid members and the encasing thereon.

7. A method of internally lining receptacles according to claim 1 wherein the lining plates are formed with concentric corrugations effective to permit expansion and contraction of each plate.

8. A method of internally lining receptacles according to claim 1 wherein said lining plates define a free space with said receptacle walls such method including positioning a packing against the receptacle wall prior to securing of said lining plates, effective to fill said free space.

9. A method of internally lining receptacles as specified in claim 1 wherein the plastics material encasing said grid members is selected from the group comprising: a polyolefine; a vinyl derivative; polystyrene; a polyester; a polycarbonate and a polyamide.

10. A method of internally lining receptacles as specified in claim 1 wherein the lining plates are formed from a plastics material selected from the group comprising a polyolefine; a vinyl derivative; polystyrene; a polyester; a polycarbonate and a polyamide.

11. A receptacle comprising walls; interior faces to said walls; a plurality of members of a rigid material secured to said interior faces effective to form a wide meshed grid; a weldable plastics coating encasing each said member; and lining plates of weldable plastics material welded to said coatings effective to cover the interior faces of said receptacle.

12. A receptacle as claimed in claim 11 wherein said members comprise flat elements of iron.

13. A receptacle as claimed in claim 11 and further comprising at least one fixing plate affixed to said receptacle walls, said members of rigid material being affixed thereto.

14. A receptacle as claimed in claim 11 wherein said members of rigid material are secured to said receptacle walls by screw means extending through said members and the coating thereon.

15. A receptacle as claimed in claim 11 and further comprising concentric corrugations on said lining plates, effective to permit expansion and contraction of each said plate.

16. A receptacle as claimed in claim 11 and including packing means interposed between said lining plates and the associated interior face of said receptacle.

17. A receptacle as claimed in claim 11 wherein said coating on said member of rigid material is formed of a plastics material selected from the group comprising: a polyolefine; a vinyl derivative; polystyrene; a polyester; a polycarbonate and a polyamide.

18. A receptacle as claimed in claim 11 wherein said lining plates are formed of a plastics material selected from the group comprising: a polyolefine; a vinyl derivative; polystyrene; a polyester; a polycarbonate and a polyamide.

No references cited.

THERON E. CONDON, *Primary Examiner.*

G. T. HALL, *Assistant Examiner.*